United States Patent [19]

Kämpf et al.

[11] 3,757,563
[45] Sept. 11, 1973

[54] MEASUREMENT PNEUMATICALLY OF THICKNESSES OF COATINGS

[75] Inventors: Günther Kämpf; Hans-Geörg Volz, Krefeld, Germany

[73] Assignee: Bayer Aktiengesellschaft, Leverkusen, Germany

[22] Filed: Mar. 18, 1971

[21] Appl. No.: 125,662

[30] Foreign Application Priority Data
Mar. 24, 1970 Germany.................. P 20 14 071.0

[52] U.S. Cl.......... 73/37.5, 235/92 DN, 235/151.32
[51] Int. Cl............................................. G01b 13/02
[58] Field of Search ........................73/37.5–37.8; 250/219 TH; 235/92 DN, 151.32

[56] References Cited
UNITED STATES PATENTS

| | | | |
|---|---|---|---|
| 3,378,676 | 4/1968 | Clement.................. 250/219 TH X |
| 2,927,455 | 3/1960 | Outterson............................ 73/37.7 |
| 2,656,845 | 10/1953 | Lindsay....................... 250/219 TH |

Primary Examiner—Richard C. Queisser
Assistant Examiner—Daniel M. Yasich
Attorney—Burgess, Dinklage & Sprung

[57] ABSTRACT

Apparatus for pneumatically measuring the thickness of a coating on a support. A pneumatic measurement nozzle is mounted on a nozzle-carrying plate for directing a gas stream toward the support which rests on a base member. The nozzle-carrying member is movably mounted on guides. An absolutely calibrated fine measurement sensor is mounted on the device with one end connected to the nozzle-carrying plate and the other end connected to the base. A calibrated indicating instrument is operatively mounted in the pneumatic supply system for indicating discharge resistance at the nozzle and thereby indicating the elevation of the nozzle-carrying member relative to the base. For the measurement, a partially coated support can be placed on the base with an uncoated portion of the support beneath the nozzle. The nozzle can be moved to a selected elevation as a first position, and the elevation of that position can be read with the fine measurement sensor and the value stored in a computer, and the reading on said calibrated indicating instrument for said elevation can be noted. The support can then be moved so that a coated portion thereof is beneath the nozzle, and the nozzle can then be moved to a second position to provide the same reading on the calibrated indicating instrument. The elevation of the nozzle at said second position can be read with the fine measurement sensor and the measurement value fed to the computer, and the film thickness can then be determined by comparing the readings of the fine measurement sensor.

9 Claims, 4 Drawing Figures

Patented Sept. 11, 1973 3,757,563
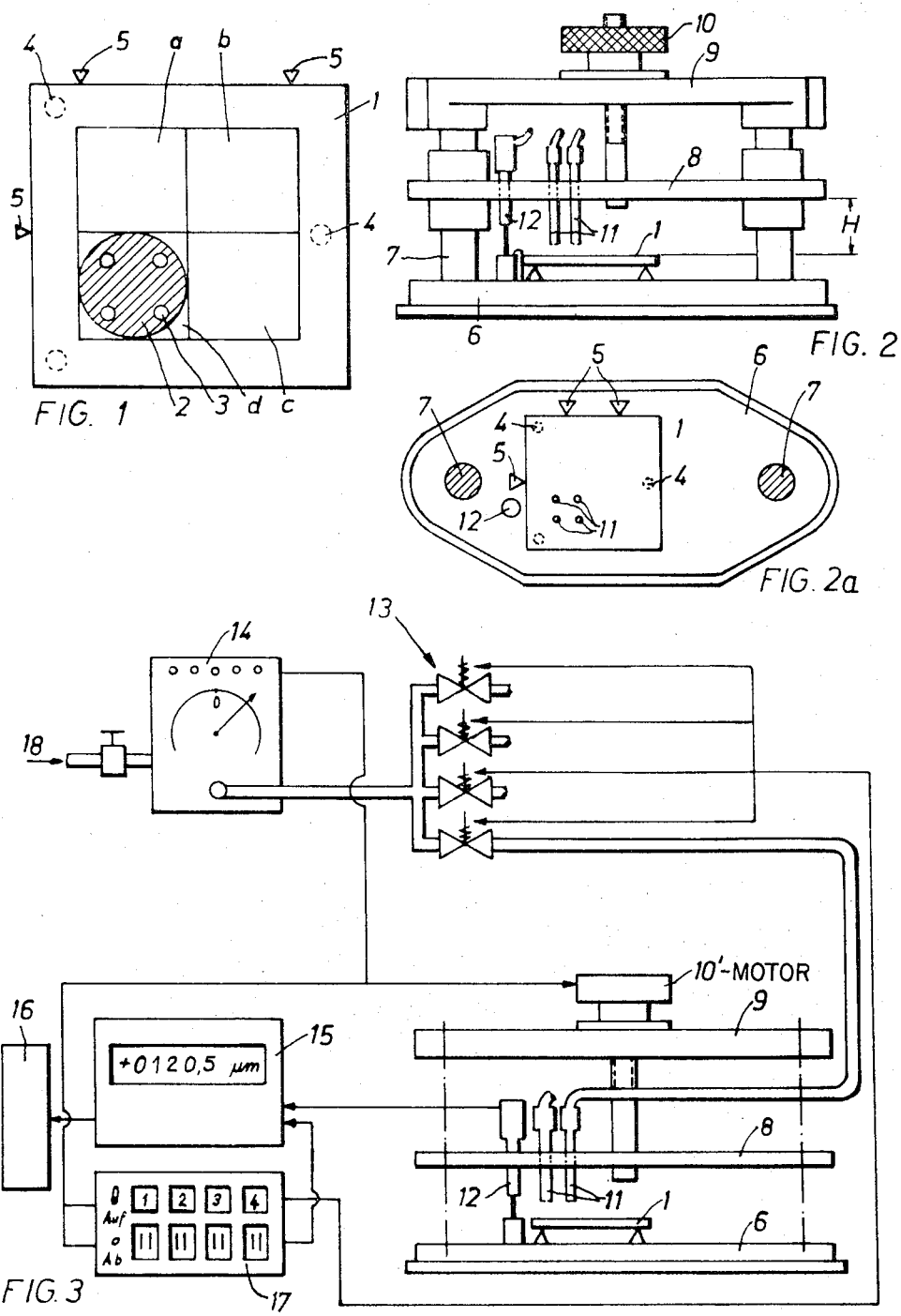
INVENTORS:
GÜNTHER KÄMPF, HANS G. VÖLZ.
BY
Burgess, Dinklage & Sprung

MEASUREMENT PNEUMATICALLY OF THICKNESSES OF COATINGS

The invention relates to a method by which the thickness of coatings are measured pneumatically, the method being more especially for establishing the thickness of lacquer coatings and films of pigmented paints, but also of coatings of synthetic plastics, enamel and other coatings applied to a flat support. In this respect use is made of the fact that the discharge resistance of one or more measuring nozzles depends on their spacings from the coating (literature references (4), (5) and (6)).

Unpigmented lacquers and pigmented paint films are used to an increasing degree with all everyday articles. Both the manufacturers and the processers of lacquers and paint materials must sensitively and accurately measure the optical properties of their products on separate samples and by series investigations (for continuous quality control in production). Particular standards are set in this respect for pigmented paint films, whether in the form of uncoloured, i.e., white, or coloured paints. The decisive optical characteristic value with these products is the covering power. For uncoloured paint films, suitable methods of determination have been standardised in the U.S.A. (1) and in Germany (2), and for coloured paint films, scientific works are in existence concerning suitable methods of determination. By covering power within the terms of the standard there is understood the power of a paint to cause the disappearance of the contrast between a black undercoat and a white undercoat in such a way that, with the same thickness of coating, the degree of light remission above a black undercoat amounts to 98 percent of the degree of light remission above a white undercoat (according to reference (2)).

Particular significance is attributed with these methods of determination to the accurate measurement of the coating thickness. According to DIN Specification 53 162, the thickness of coating is measured gravimetrically. This method of measurement has a number of serious disadvantages, which at the present time drastically restrict the measurement of the covering power as regards its accuracy and rapidity of execution.

1. With the known method, what is involved is an integral method, i.e., only a mean coating thickness over a relatively large surface is determined. Fluctuations in the thickness of the undercoat and fluctuations in the thickness of the applied paint film cannot be appreciated.

2. Variations in weight of the undercoat (for example, due to moisture fluctuations) and of the paint film (for example due to drying) must be taken into account by difficult measurements, which naturally have a negative influence on the accuracy of the measurement of the coating thicknesses (see DIN 53 162, Sheet 1, Point 7.2 "Moisture correction," and Sheet 2, Point 2 "Determination of the dry sediment").

3. The density of the paint film must be established by a complicated procedure by calculation from the measurement data.

The invention now has for its object to develop a method of measuring coating thicknesses in which these disadvantages are avoided and which still permits a measurement accuracy of ± 1 $\mu$m ($\mu$-micron) in a measuring range from 0 up to at least 200 $\mu$m, with a measurement sensitivity of about 0.5 $\mu$m. The measurement is to be effected without contact and free from any destruction at various positions on the specimen in small surface regions (< 4 mm$^2$). As support for the coating, there are to be used glass plates with a thickness between 2 and 8 mm. Furthermore, the measurement is not to be influenced by the pigment volume concentration. In addition, there is to exist the possibility of the measurement procedure being partially or fully automated.

Having these requirements in mind, practically all conventional measurement methods are excluded. With a mechanical length measurement, the pressures applied to the film, even with smallest possible bearing force, lead to deformation of plastic paint films because of the very small measurement head areas. The optical measurement of thin sections, using the optical or optical section microscope, is not free from destruction. Electrical or magnetic thickness measurements require an electric or magnetically conducting support. They involve serious difficulties. A determination of thicknesses from the absorption or redispersion of X-rays, $\beta$-rays or $\gamma$-rays is excluded, since these methods are dependent on the nature and also concentration of the pigment or filler. A determination using interferometry (for example according to Tolansky) is likewise excluded, since the necessary, partial detachment of the film with subsequent vapour-coating of the measurement surface with silver under high vacuum is not free from destruction and the high vacuum treatment additionally leads to new measurement errors.

All the requirements indicated are satisfied by the pneumatic measurement method according to the invention. The invention is characterised in that, in accordance with a zero method, one or more measurement nozzles are set at a constant prescribed distance from coated and uncoated coating supports and the difference in these settings is measured with an absolutely calibrated fine measurement sensor. The distance or spacing value obtained with the measurement of the uncoated support is preferably stored as an input value with the measurement of the coated support. The difference formation can then be effected in known manner by electrical means.

The arrangement for carrying the method according to the invention into effect consists of a three-point mounting for the coating support and of a nozzle-guiding plate which is adjustable in its height above the coating support and is displaceable in exact parallel relationship relatively to the mounting of the coating support, on which plate are fixed at least one measuring nozzle and an absolutely calibrated fine measurement sensor. For automatically raising and lowering the nozzle-guiding plate and for bringing the said nozzles into effect at will, an electronic control apparatus is provided. The indicating instrument advantageously has connected thereto an analogue-digital converter and also an electronic data processing apparatus.

The calibrated fine measurement sensor preferably consists of a high accurate inductive travel pick-up device as known per se.

One constructional example of the invention is shown in the drawing and is hereinafter more fully described. In the drawing:

FIG. 1 shows a glass plate, which is used as coating support,

FIG. 2 is a side elevation of the measuring arrangement,

FIG. 2a is a horizontal section of the instrument shown in FIG. 2, and

FIG. 3 is a diagrammatic general view, from which can be seen the construction and method of operation of the complete measuring apparatus.

According to FIG. 1, planoparallel glass plates 1 which are deep black in colour, of the size 100 × 100 mm. with a thickness of 5 mm ± 0.01, are used as support for the lacquer films. Of each film, four circular surface sections 2 (diameter 35 mm) are measured optically in known manner with a remission photometer. The thickness at four selected and definitely fixed points 3 on a measurement surface is determined by means of measurement nozzles 11. By rotation of the plate through 90°, the other measurement surfaces designated at the sides of the glass plate 1 by the letters $a - d$ are determined. The glass plate rests in the pneumatic measuring arrangement on three supporting points 4 (flattened hard metal hemispheres) and is fixed in its position by means of abutments 5.

FIGS. 2 and 2a are diagrammatic views in side elevation and horizontal section of the measuring frame. Situated above a base plate 6 is a displaceable nozzle-guiding plate 8 which is mounted on cylindrical guides 7. Arranged above the plate is a cover plate 9 with a hand wheel 10. The cylindrical guide 7 guarantees an exact planoparallel displacement of the nozzle-guiding plate 8. Fixed on the latter are four measuring nozzles 11. Disposed on the base plate 6 is the object 1 which is to be measured. The supporting points 4 and abutments 5 guarantee an unequivocal and defined support. A known inductive fine measurement sensor 12 having a movable core is fixed with its upper end (core) on the nozzle guided plate 8 and rests at its bottom end (coil) on the base plate. The mounting of the core and coil could of course be reversed.

The determination of the coating thickness of the paint films arranged on the glass plates is effected by measuring the spacing of the nozzles 11 from the measurement surface. Since, as mentioned above, the length of the linear measurement range with the required high indication accuracy is only limited and is too small for the different coating thicknesses which occur in practice, the nozzles 11 in the present apparatus are mrely used as a "zero indication," i.e., the guiding plate 8 is always lowered to a constant, prescribed distance from the measurement surface. The actual measurement of the spacing is effected by an inductive fine measurement sensor 12, which guarantees a read-off accuracy to within 0.05 $\mu$m with a linear measurement range up to 2 mm.

The measurement of the film thickness is effected absolutely. That is to say the spacing value obtained for an uncoated portion of the glass plate, by for example an analog-digital converter (connected to the fine measurement sensor) for some arbitrary spacing H (FIG. 2) of the guide plate 1 is stored as an input value. The spacing H is indicated by the reading of pneumatic indicating instrument 14 (FIG. 3). A coated portion of the glass plate is then placed under the nozzles 11, and the level of the nozzle guide plate 8 is then adjusted to the spacing H between the upper surface of the coating and the guide plate 8 with the aid of the pneumatic indicating instrument. A second input value is then obtained for the correspondingly changed condition of the fine measurement sensor 12. The two input values are compared to obtain the thickness of the coating as the difference therebetween.

The construction and the functioning of the complete measuring apparatus will be apparent from FIG. 3:

Employed as measurement frame is a column frame with a measurement surface of 160 × 125 mm. or 125 × 100 mm. Instead of the hand wheel 10 for moving the nozzle-guiding plate 8, a setting motor 10', as shown in FIG. 3, is used. The latter is controlled through the measuring nozzles which can be switched on in succession by means of remotely controlled magnetic valves 13 and a second recording instrument in the form of a pneumatic indicating instrument 14 in such a way that the motor is switched off after reaching a prescribed and fixed set spacing of the nozzles 11 from the measurement surface ("zero point"). In order to guarantee a rapid and nevertheless accurate adjustment, the motor M is controlled so that it runs at high speed at first and is switched to a low speed during its approach to the set spacing. A control contact disposed on the indicating instrument 14 switches the motor to the slow speed when the guide plate is 50 microns from the set spacing. The four individual values of the four measuring nozzles are not of interest, but only the mean value, so that also the four measuring nozzles can be switched on simultaneously and utilised for controlling the setting motor. The indication of the adjusted spacing between nozzle-guiding plate 8 and measurement surface is effected by way of the inductive fine measurement sensor 12, the value of which is passed to the first recording instrument in the form of the indicating instrument 15 (analogue-digital converter) in digital form. By means 0f a connected small computer 16, it is possible to effect the calculation of the mean value and the standard deviation.

The functioning of the switching and control instrument with digital actual value setting means 17 is important. This instrument contains a switch for raising the nozzle-guiding plate 8 (positioning of the plate to be measured) and for the motivated lowering movement. In addition, four pressbuttons are provided for switching on the nozzles 11. Belonging to each pushbutton is a two-position digital nominal value setting device. By means of the latter, the deviations measured on the uncoated glass plate 1 from the "zero point" (prescribed and fixedly set spacing between nozzle-guiding plate 8 and measurement surface, which is indicated through the nozzles on the indicating instrument 14 and adjusted by the setting motor) are programmed into the digital indicating instrument 15, so that the values measured on the coated glass plate at the same position directly gives the film thickness (absolute measurement). The zero point is so adjusted that the deviations of the individual measurement points of the various glass plates (thickness tolerance 10 $\mu$m) is always effected with the same sign, i.e., in one direction.

The supply of the compressed air is by way of the pipe opening 18 and through a reducing station, a filter and a shut-off valve.

Briefly summarised, the measuring operation takes place as follows: After the positioning of the uncoated glass plate, the nozzle-guiding plate is lowered by means of the setting motor. Then there is effected the zero setting and indication of the measurement value on the indicating instrument 15, i.e., the determination of the deviation from the prescribed zero point.

These measurements are effected in succession on the plate quadrants *a* to *d* and respectively all four nozzles. The deviations in zero point which are obtained are noted. In principle, this measurement is carried out only once for each of the glass plates, which can very often be used again.

After the coating, the known zero point deviations of the four nozzles are prescribed by means of the digital nominal value setting device for each of the plate quadrants *a* to *d*. The measurements take place as described above. The absolute coating thickness measurement values are then directly shown on the indicating instrument 15 and recorded by means of a possibly following printing unit. Literature:

1. ASTM, D 1738-60 T (1960)
2. DIN 53 162, Sheets 1 and 2 (1965)
3. H. G. Völz, farbe + lack 71 (1965) 725–734
   L. GAU, farbe + lack 72 (1966) 955–965
4. E. Göthel, Deutsche Kraftfahrforschung, No. 80 (1144) 1 – 38
5. Vie automobile (1931) pages 322 – 323 French Pat. Nos. 685,416 and 722,685 German Pat. Nos. 528,186 and 547,835 British Pat. No. 326,674
6. M. Raum, Z. techn. Physik 24 (1943) 46 – 53.

We claim:

1. Apparatus for pneumatically measuring the thickness of a coating applied to a support, comprising:
   a. a frame, including a base, and upright guides mounted on the base;
   b. a nozzle-carrying member movably mounted on the guides for movement on the guides in planoparallel relation with respect to the horizontal;
   c. at least one pneumatic measurement nozzle mounted on the nozzle-carrying member for directing a gas stream toward the base;
   d. means for moving the nozzle-carrying member along said guides in said planoparallel relation whereby the nozzle can be positioned at a selected elevation with respect to the support when mounted on the base,
   e. an absolutely calibrated fine measurement sensor, comprising a sensor means, one end of which is connected to the nozzle-carrying member and the other end of which is connected to the base for measuring the elevation of the nozzle-carrying member with respect to the base;
   f. a pneumatic supply system for delivering gas to the nozzle for the pneumatic measurement; and
   g. a calibrated indicating instrument operatively mounted in the pneumatic supply system for indicating discharge resistance at the nozzle, and thereby indicating the elevation of the nozzle-carrying member relative to the base, whereby when a partially coated support is placed on the base with an uncoated portion of the support beneath the nozzle, the nozzle is moved to said selected elevation with respect to the uncoated portion of the support as a first position, the selected elevation is read with the fine measurement sensor, the reading on said calibrated indicating instrument for said elevation can be noted; and when a coated portion of the support is placed beneath the nozzle, the nozzle is moved to a second position to provide the same reading on the calibrated indicating instrument, the elevation of the nozzle at said second position is read with the fine measurement sensor, the film thickness can then be determined by comparing the readings of the fine measurement sensor.

2. Apparatus according to claim 1, said absolutely calibrated fine measurement sensor, including a recording instrument for recording the measurements of the fine measurement sensor.

3. Apparatus according to claim 2, the sensor element of said fine measurement sensor being an inductive travel pick-up.

4. Apparatus according to claim 3, said absolutely calibrated fine measurement sensor, including an analogue digital converter, and an electronic data processing apparatus for averaging measurement values.

5. Apparatus according to claim 1, and means for receiving the coated support comprising a three point mounting, said means for moving said nozzle carrying member comprising an electrical drive, and means for selectively controlling the electrical drive, and a valve for turning the supply of gas in the pneumatic system on and off, and electrical control means for the valve.

6. Apparatus according to claim 5, said absolutely calibrated fine measurement sensor, including an analogue digital converter, and an electronic data processing apparatus for averaging measurement values.

7. Apparatus according to claim 6, the sensor element of the fine measurement sensor being an inductive travel pick-up.

8. Apparatus according to claim 7, including a plurality of said nozzles.

9. Apparatus according to claim 1, including a plurality of said nozzles.

* * * * *

UNITED STATES PATENT OFFICE
CERTIFICATE OF CORRECTION

Patent No. 3,757,563  Dated September 11, 1973

Inventor(s) Günther Kämpf and Hans-Georg Völz

It is certified that error appears in the above-identified patent and that said Letters Patent are hereby corrected as shown below:

Col.1, line 66, change "($\mu$-micron)" to --($\mu$m = micron)--

Signed and sealed this 16th day of April 1974.

(SEAL)
Attest:

EDWARD M. FLETCHER, JR.
Attesting Officer

C. MARSHALL DANN
Commissioner of Patents